United States Patent [19]

Hachiga

[11] Patent Number: 5,581,598
[45] Date of Patent: Dec. 3, 1996

[54] APPARATUS AND METHOD FOR SETTING AN ID NUMBER BY SOUND IN A CORDLESS TELEPHONE

[75] Inventor: Hitoshi Hachiga, Ichihara, Japan

[73] Assignee: Uniden Corporation, Chiba, Japan

[21] Appl. No.: 599,501

[22] Filed: Jan. 25, 1996

Related U.S. Application Data

[63] Continuation of Ser. No. 235,743, Apr. 29, 1994, abandoned.

[30] Foreign Application Priority Data

Sep. 24, 1993 [JP] Japan .................................. 5-238093

[51] Int. Cl.⁶ .................................................. H04Q 7/20
[52] U.S. Cl. .................................................. 379/62; 379/61
[58] Field of Search .............................. 379/45, 47, 59, 379/61, 62, 58, 159, 361, 157, 388; 455/73, 89

[56] References Cited

U.S. PATENT DOCUMENTS

| | | | |
|---|---|---|---|
| 4,639,549 | 1/1987 | Hirayama et al. | 379/62 |
| 4,639,550 | 1/1987 | Yamagawa et al. | 379/62 |
| 4,679,225 | 7/1987 | Higashiyama | 379/62 |
| 4,979,205 | 12/1990 | Haraguchi et al. | 379/61 |
| 5,260,701 | 11/1993 | Guern et al. | 340/825.44 |
| 5,396,538 | 3/1995 | Hong | 379/58 |
| 5,426,690 | 6/1995 | Hikuma et al. | 379/62 |

FOREIGN PATENT DOCUMENTS

| | | |
|---|---|---|
| 0178393 | 4/1986 | European Pat. Off. . |
| 0196834 | 10/1986 | European Pat. Off. . |
| 4138935 | 6/1993 | Germany . |
| 4-144344 | 5/1992 | Japan . |
| 5-95390 | 4/1993 | Japan . |
| 5-176039 | 7/1993 | Japan . |
| 5-211543 | 8/1993 | Japan . |
| 2256113 | 11/1992 | United Kingdom . |
| 8502738 | 6/1985 | WIPO ..................................... 379/62 |

OTHER PUBLICATIONS

Panasonic, "Cordlessphone Model No. KX–T3000" Sep. 1988.
Sony, "SPP–57 Cordless Telephone", 1992.

*Primary Examiner*—William Cumming
*Attorney, Agent, or Firm*—Lowe, Price, LeBlanc & Becker

[57] ABSTRACT

To make it possible to easily carry out registration of a mutual ID number (ID) in a slave telephone set in cordless telephone device by only operating a switch or buttons, in the cordless telephone device according to the present invention, a sound generating element and a sound receiving element located closer and opposing to each other when the slave telephone set is set on a cradle of the master telephone set are provided in the master telephone set and the slave telephone set respectively, and ID signal sound is transferred between the two elements, so that even an ordinary user can carry out the ID registration requiring very complicated operations in the conventional technology without fail.

19 Claims, 5 Drawing Sheets

APPARATUS AND METHOD FOR SETTING AN ID NUMBER BY SOUND IN A CORDLESS TELEPHONE

This application is a continuation of application Ser. No. Apr. 29,1994 now abandoned.

FIELD OF THE INVENTION

The present invention relates to a cordless telephone device in which call between a master telephone set and a slave telephone set is supported only when a mutual ID number stored in the master telephone set coincides with that stored in the slave telephone set, and more particularly to an improved type of cordless telephone device in which registration of a mutual ID number can easily be carried out by transferring a mutual ID number stored in a master telephone set to a slave telephone set to be stored therein.

BACKGROUND OF THE INVENTION

In this type of cordless telephone device, a control circuit is provided so that call is supported, only when a mutual ID number stored in a master telephone set connected to a telephone line coincides with that stored in or more slave telephone sets connected with the master telephone set by radio communication, between the master telephone set and the one or more slave telephone sets.

However, in this type of cordless telephone device based on the conventional technology, when a slave telephone set must be replaced for maintenance, it is necessary to carry out a very complicated work for exchanging a memory (or rewriting a content of memory) in which mutual ID numbers are stored by opening or closing a cabinet for the slave telephone set, and also when a new slave telephone set which can communicate with the master telephone set is extended, it is necessary to carry out a very complicated work for transferring the mutual ID numbers stored in the master telephone set to the new slave telephone set to be stored therein by opening or closing a cabinet for the slave or mater telephone set, and in either case the telephone set must be taken to a dealer or a service man must be called for that purpose, which is very troublesome.

SUMMARY OF THE INVENTION

It is an object of the present invention to provide an improved type of cordless telephone device in which registration of a mutual ID number in a slave telephone set can easily be carried out without fail by only operating a switch or buttons without opening or closing a cabinet for the salve telephone set not for the master telephone set.

Namely in the cordless telephone device according to the present invention comprising a master telephone set connected to a wire telephone line and a slave telephone set mounted on a cradle of the master telephone set to be electrically charged and connected to the master telephone set through a radio system and having a ID number memory means for storing mutual ID numbers in the master telephone set and the slave telephone set respectively, the cradle of the master telephone set has a sound generating means, said slave telephone set has a sound receiving means provided close to and opposing to the sound generating means when the slave telephone set is mounted on the cradle, and a mutual ID number is registered in the slave telephone set by writing the mutual ID number read out from the ID number memory means of the master telephone set via the sound generating means and the sound receiving means opposing to each other in the ID number memory means of the slave telephone set.

For this reason, in the cordless telephone device according to the present invention, it is not necessary to open or close a cabinet for a master or slave telephone set, and an operator can easily register a mutual ID number in a slave telephone set can by means of simple switch operation.

As understood from the above description, with the present invention, it is possible to achieve the particularly remarkable effect that registration of a mutual ID number (ID) in a slave telephone set in a cordless telephone device requiring very complicated operations in the conventional technology can easily be carried out by an operator through simple operation.

Other objects and features of this invention will become understood from the following description with reference to the accompanying drawings.

DESCRIPTION OF THE PREFERRED EMBODIMENTS

Detailed description is made for preferred embodiment of the present invention with reference to the related drawings.

Figure 1B:
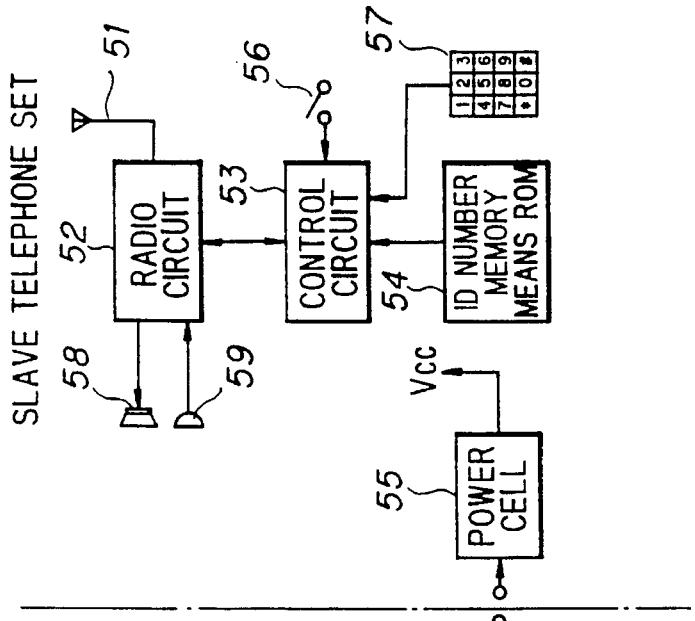
FIG. 1B is a block chart illustrating a conventional type of circuit configuration of a slave telephone set in a cordless telephone device.
Figure 1A:
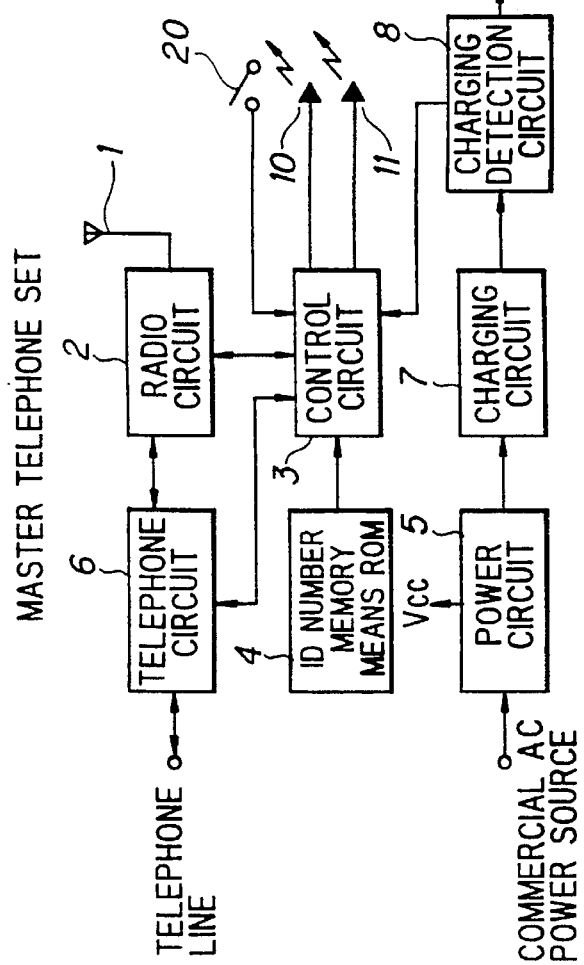
FIG. 1A is a block chart illustrating a conventional type of circuit configuration of a master telephone set in a cordless telephone device.

At first, a general example of circuit configuration in this type of cordless telephone device based on the basic technology is shown in FIGS. 1A and 1B.

FIG. 1A shows circuit configuration in a master telephone set, in which DC power voltage VCC taken out from a power circuit 5 connected to a commercial AD power source is supplied to other circuits and is also supplied via a charging circuit 7 and a charging detection circuit 8 successively to a 1.5 charging terminal of the cradle. On the other hand, the master telephone set transmits and receives outgoing or incoming aural signals for a telephone circuit 6 connected to a wire telephone line to and from a radio circuit 2 under control by a control circuit 3 driven according to operation of a slave telephone set calling switch 20, transmits and receives carrier aural signals via a transmitting/receiving antenna 1 to and from a slave telephone set, supplies a mutual ID number read out from a read-only memory (ROM) in a ID number memory means 4 to the radio circuit 2 via the control circuit 3, and carries the mutual ID number to the slave telephone set prior to the aural signal. It should be noted that a charging detection signal from the charging detection circuit 8 is supplied via the control circuit 3 to a display unit 10 comprising, for instance, a light-emitting diode to indicated that a slave telephone set mounted on the cradle is being charged and also a signal detected by the control circuit 3 is supplied to a display unit 11 to indicate a state of connection between the slave telephone set and the master telephone set.

FIG. 1B shows circuit configuration of a slave telephone set, in which DC power voltage VCC from a power cell 55 charged by DC voltage from a charging terminal connected to a master telephone set when the slave telephone set is placed on a cradle of the master telephone set is supplied to each circuit, and received voice is supplied to a speaker 58 or transmitted voice is transmitted from a microphone 59 according to a carrier aural signal transmitted or received via the transmitting/receiving antenna 51 and a radio circuit 52 under control by a control circuit 53 driven according to operation of a call switch 56.

It should be noted that the slave telephone set is driven according to operation of dial buttons 57, transmits a station selecting signal prior to a carrier aural signal via the control circuit 53, and controls a state of connection between the slave telephone set and a master telephone set with the control circuit 53 by reading a mutual ID number transmitted or received prior to the carrier aural signal from the ID number memory means 54. For this reason, also a ID number memory means 54 in the salve telephone set is a read-only memory (ROM).

Figure 2A:
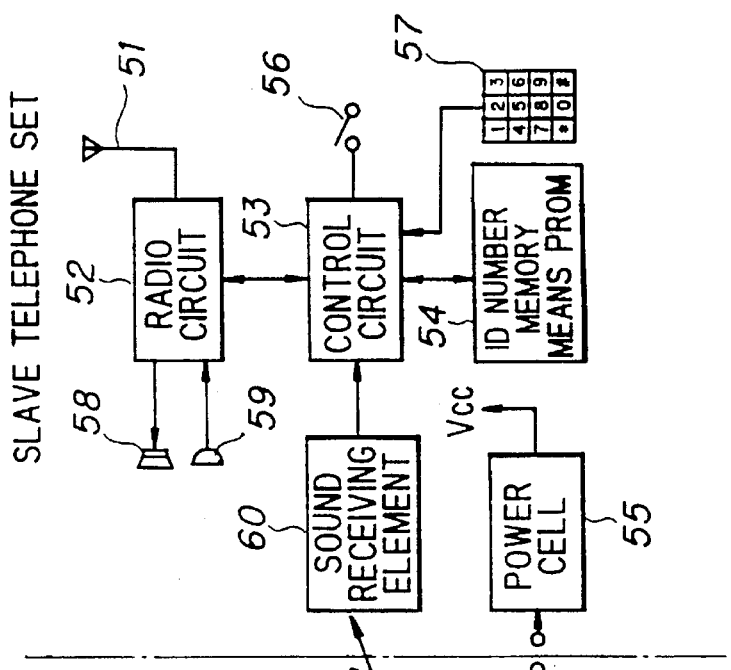
FIG. 2A is a block diagram illustrating an example of circuit configuration of a master telephone set according to the present invention.
Figure 2B:
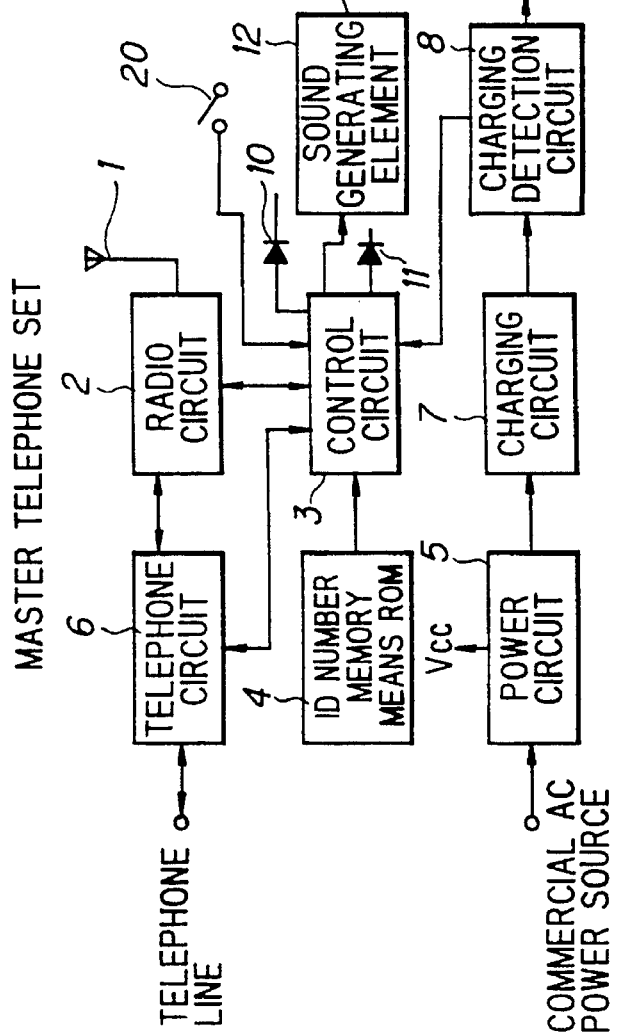
FIG. 2B is a block diagram illustrating an example of circuit configuration of a slave telephone set according to the present invention.

An example of circuit configuration in a cordless telephone device according to the present invention in which the circuit configuration based the basic technology has been improved is shown in FIGS. 2A and 2B in correspondence to the example basic circuit configuration shown in FIGS. 1A and 1B. FIG. 2A shows circuit configuration of a master telephone set like in FIGS. 1A and 1B, while FIG. 1B shows circuit configuration of a slave telephone set, and the major portion shown in FIG. 2A and FIG. 2B is the same as that shown in FIG. 1A and FIG. 1B.

A different point in circuit configuration of the master telephone set according to the present invention shown in FIG. 2A from the basic configuration as shown in FIG. 1A is that a sound generating means 12 for converting a mutual ID number read out from the ID number memory means 4 with the control circuit 3 and directly transmitting the ID number to a slave telephone set mounted on the cradle is provided. Also a different point in circuit configuration of the salve telephone set according to the present invention shown in FIG. 2B from that shown in FIG. 1B is that the ID number memory means 54 has been replaced with a programmable read-only memory (PROM) and a sound receiving element 60 for receiving the ID aural signal is provided at a position opposite to the sound generating element 12.

Figure 3:
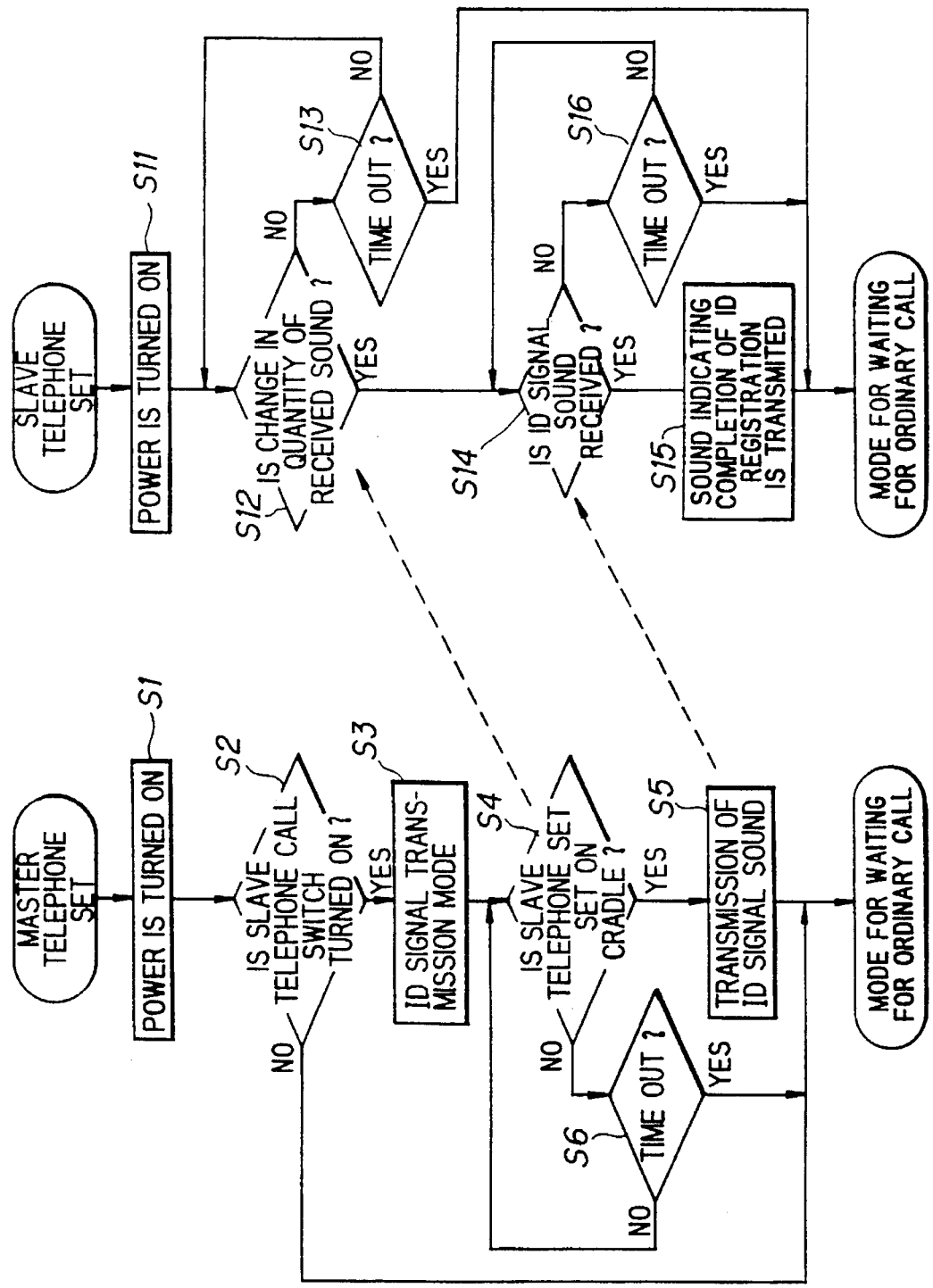
FIG. 3 is a flow chart illustrating an operation for registration of a mutual ID number in a slave telephone set in the cordless telephone device according to the present invention.

A sequence for writing a mutual ID number read out from a ID number memory means (ROM) in a master telephone set in a ID number memory means (P ROM) in a slave telephone set for registration in the cordless telephone device according to the present invention having the circuit configuration as described above is illustrated in the flow chart shown in FIG. 3.

In the flow chart shown in this figure, at first power is turned ON when a power cell is installed in Step S11 in the side of a slave telephone set, then power switch is turned ON in Step 1 in the side of a master telephone set, then a slave telephone set calling switch 20 is turned on in Step S2, and further more ID signal transmission mode is effected in step S3 to wait for setting of the slave telephone set on the cradle.

Then in Step S12 in the side of slave telephone set, when the slave telephone set is set on a cradle of a master telephone set, a sound receiving element 60 gets closer to the cradle and is covered by it, so that input of peripheral sound is interrupted to some extent and change in a quantity of received sound is detected, thus the mode for waiting for reception of an ID signal from the master telephone set being effected, and in Step S4 in the side of master telephone set, the act that the slave telephone set has been set on the cradle is detected by the charging detection circuit 8, and transmission of ID signal sound from the sound receiving element 12 is started in Step S5.

Then in Step S14 in the side of slave telephone set, the ID signal sound from the master telephone set 60 is received at a level higher than the peripheral sound by the sound receiving element 60, output of the ID signal sound is supplied to the control circuit 53, the received ID signal is stored in the ID number memory means 54 (PROM) for registration of a mutual ID number, and then in Step S15, the mode for waiting for ordinary call is effected after transmitting sound indicating completion of ID registration. On the other hand, the master telephone set repeats transmission of the ID signal sound in Step S5 several times and then enter a state for waiting for ordinary call.

If the operation for calling a slave telephone set is not executed in Step S2 in the side of master telephone set, the mode for waiting for ordinary call is started immediately, and if the fact that the slave telephone set has been set on the cradle is not detected in Step S4, operation shifts to Step S6, detection of charging due to setting of the slave telephone set on the cradle is repeated continuously for a specified period of time, and after the specified period has passed, it is determined that the operation for registration of ID is not required, and the mode for waiting for ordinary call is started.

On the other hand, if change in a quantity of received sound is not detected when the slave telephone set is set on the cradle in Step S12 in the side of slave telephone set, and also if the received ID signal sound is not detected in Step S14, operation goes to Step S13 and Step S16 respectively, and specified operation for detecting the ID signal is repeated for a specified period of time, and then after the specified period of time has passed, it is determined that the operation for registering ID number is not necessary and the mode for waiting for ordinary call is effected.

Figure 4:
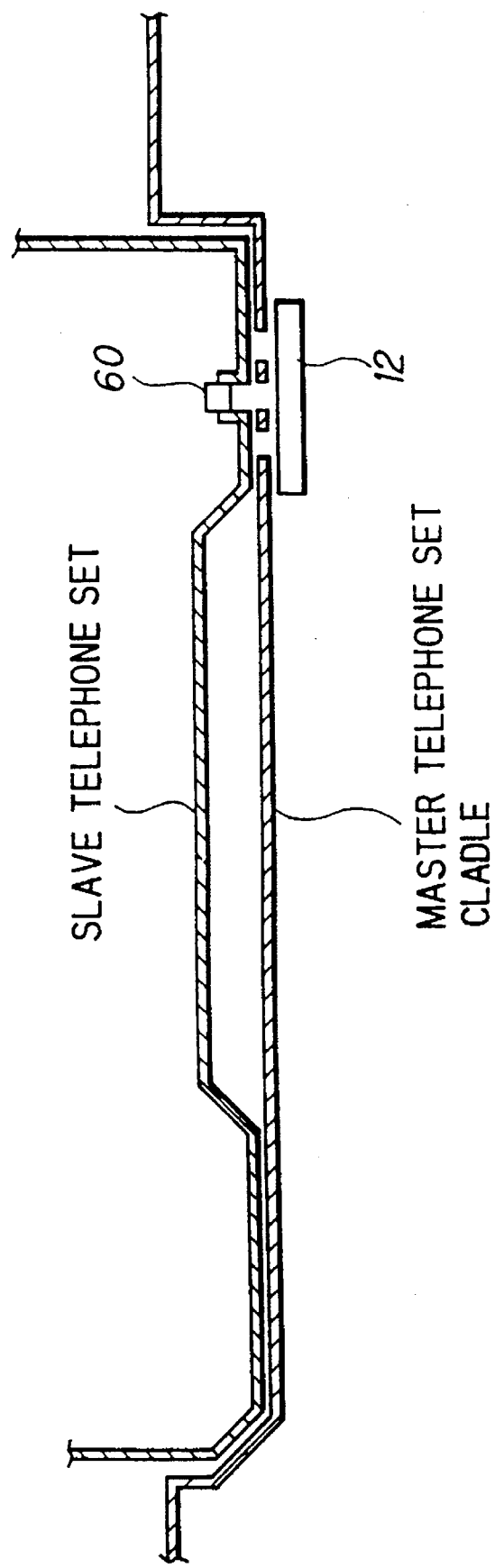
FIG. 4 is a cross sectional view illustrating an example of configurational arrangement when a mutual ID number is registered in a slave telephone set in the cordless telephone device according to the present invention.
Figure 5:
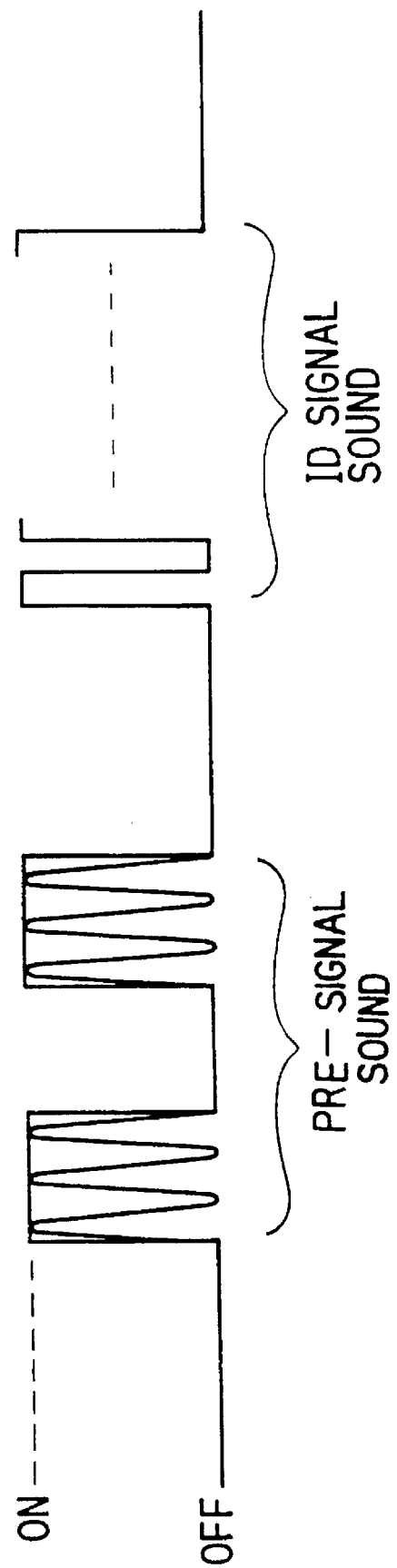
FIG. 5 is a signal waveform view illustrating signal sound for transferring a mutual ID number to be registered in a slave telephone set in the cordless telephone device according to the present invention.

The state where the sound generating element 12 in the side of master telephone set and the sound receiving element 60 in the side of slave telephone set are located closer and opposing to each other for converting a mutual ID number to be registered in the salve telephone set to an acoustic signal as well as for signal transmission between them when s slave telephone set for cordless telephone device is set at a specified position on a cradle of a master telephone set, which is a master element of the present invention, is for instance as shown in FIG. 4, and in this state a open surface of the sound receiving element 60 in the slave telephone set is enclosed by a side wall of the cradle's side wall, so that a level at which the peripheral sound is received goes lower than that in a state where the slave telephone set is available for ordinary call, this change in a quantity of received sound is detected, and the slave telephone set enters a mode for waiting for reception of ID signal sound from the master telephone set, but it is possible to cause the salve telephone set to enter the waiting mode for ID signal without fail by transmitting intermittently alerting signal sound having a different cycle from a bit cycle of the ID signal sound from the sound generating element 12 of the master telephone set prior to transmission of ID signal sound from the master telephone set, as shown in FIG. 5, so that the ID signal sound continuously sent from the master telephone set is received by the slave telephone set without fail.

A sound generating element for generating bell sound conventionally provided on a surface contacting the slave telephone set on the cradle, or a speaker for intercom or for speaker phone can also be used as the sound generating element 12 to be incorporated in the cradle of the master telephone set.

On the other hand, a microphone conventionally used for call can also be as the sound receiving element 60 to be incorporated in the slave telephone set.

Furthermore as the ID signal sound, two types of sound wave each having a different tone frequency may be used by switching them according to the necessity, and the tone frequencies of the 2 sound waves may be set to the same tone frequencies of the two sound waves conventionally used for data communications between a master telephone set and a slave telephone set.

If a microphone conventionally used for ordinary call is used also as the sound receiving element 60 as described above, in the mode for receiving ID signal sound with a slave telephone set on a cradle of a master telephone set, preferably a sensitivity for receiving sound should be dropped from that in the mode for ordinary call to mitigate influence by the peripheral sound.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cordless telephone device comprising a master telephone set connected to a telephone line and a slave telephone set mounted on a cradle of said master telephone set to be electrically charged and connected to said master telephone set through a radio system during a call, and having memory means for storing mutual ID numbers in said master telephone set and said slave telephone set respectively; wherein said cradle of said master telephone set has a sound generating means, said slave telephone set has a sound receiving means located adjacent and opposing to said sound generating means when said slave telephone set is set on said cradle, and the mutual ID number read out from said memory means of said master telephone set is written via said sound generating means and said sound receiving means into said memory means of said slave telephone set for registration of said mutual ID number in said slave telephone set, wherein said sound generating means generates a pre-signal sound before an ID signal sound representing said mutual ID number, to prevent errors in establishing a mode of waiting for reception of said mutual ID number.

2. A cordless telephone device according to claim 1, wherein a microphone is used as said sound receiving means incorporated in said slave telephone set.

3. A cordless telephone device according to claim 1, wherein a sound generator used for generating bell sound, or as a speaker is used as said sound generating means incorporated in said cradle of said master telephone set.

4. A cordless telephone device according to claim 2, wherein a sound generator used for generating bell sound, or as a speaker is used as said sound generating means incorporated in said cradle of said master telephone set.

5. A cordless telephone device according to claim 1, wherein two sound waves each having a different tone frequency are switched to be used as sound indicating said mutual ID number transmitted between said sound generating means and said sound receiving means and tone frequencies of two sound waves conventionally used for radio data communications between a master telephone set and a slave telephone set are used as tone frequencies of said two sound waves.

6. A cordless telephone device according to claim 2, wherein two sound waves each having a different tone frequency are switched to be used as sound indicating said mutual ID number transmitted between said sound generating means and said sound receiving means and tone frequencies of two sound waves conventionally used for radio data communications between a master telephone set and a slave telephone set are used as tone frequencies of said two sound waves.

7. A cordless telephone device according to claim 3, wherein two sound waves each having a different tone frequency are switched to be used as sound indicating said mutual ID number transmitted between said sound generating means and said sound receiving means and tone frequencies of two sound waves conventionally used for radio data communications between a master telephone set and a slave telephone set are used as tone frequencies of said two sound waves.

8. A cordless telephone system according to claim 1, wherein said slave telephone set comprises means for detecting change in a volume of received sound associated with interruption of peripheral sound from said master telephone set to establish a mode of waiting for reception of said ID number.

9. A cordless telephone system according to claim 8, wherein said sound receiving means is responsive to said change detecting means for receiving a sound signal corresponding to said ID number at a level higher than a background sound level.

10. A cordless telephone device comprising a master telephone set to be connected to a telephone line and slave telephone set to be placed on a cradle of said master telephone set in order to be electrically charged, said slave telephone set being communicated with said master telephone set through a radio system during call, said cordless telephone device having first and second memories to store ID information used in the communication between said master telephone set and said slave telephone set, further comprising:

a sound generator to output a mutual ID number read from said first memory, and a sound receiver to receive said mutual ID number outputted from said sound generator;

wherein said mutual ID number received by said sound receiver is written in said second memory, and said sound generator generates a pre-signal sound before an ID signal sound representing said mutual ID number, to prevent errors in establishing a mode of waiting for reception of said mutual ID number.

11. A cordless telephone device according to claim 10, wherein a microphone is used as said sound receiver.

12. A cordless telephone device according to claim 10, wherein a sound generating element used for generating bell sound, or as a speaker is used as said sound generator.

13. A cordless telephone system according to claim 10, wherein said slave telephone set comprises means for detecting change in a volume of received sound associated with interruption of peripheral sound from said master telephone set to establish a mode of waiting for reception of said ID number.

14. A cordless telephone system according to claim 13, wherein said sound receiving means is responsive to said change detecting means for receiving a sound signal corresponding to said ID number at a level higher than a background sound level.

15. A method of setting a mutual ID number for a cordless telephone device for setting a mutual ID number between a master telephone set to be connected to a telephone line and a slave telephone set to be placed on a cradle of said master telephone set in order to be electrically charged, said slave telephone set being communicated with said master telephone set through a radio system during a call comprising:

a first step for outputting said mutual ID number from a sound generator;

a second step for receiving said mutual ID number outputted from said sound generator by a sound receiver; and a third step for storing said mutual ID number received by said sound receiver, wherein said first step comprises generating a pre-signal sound before an ID signal sound representing said mutual ID number, to prevent errors in establishing a mode of waiting for reception of said ID number.

16. The method according to claim 15, wherein said second step includes receiving said mutual ID number by a microphone.

17. The method according to claim 15, wherein said first step includes outputting said mutual ID number by a sound generating element used for generating bell sound, or as a speaker.

18. The method according to claim 15, wherein said second step comprises detecting change in a volume of received sound associated with interruption of peripheral sound from said master telephone set to establish a mode of waiting for reception of said ID number.

19. A cordless telephone system according to claim 18, wherein said second step further comprises receiving a sound signal corresponding to said ID number at a level higher than a background sound level in response to said volume change detecting.

* * * * *